(12) United States Patent
Kawahara

(10) Patent No.: US 11,323,597 B2
(45) Date of Patent: May 3, 2022

(54) DISPLAY APPARATUS AND ELECTRONIC APPARATUS

(71) Applicant: CANON KABUSHIKI KAISHA, Tokyo (JP)

(72) Inventor: Hitoshi Kawahara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 51 days.

(21) Appl. No.: 16/847,070

(22) Filed: Apr. 13, 2020

(65) Prior Publication Data

US 2020/0336640 A1    Oct. 22, 2020

(30) Foreign Application Priority Data

Apr. 16, 2019    (JP) .............................. JP2019-077737

(51) Int. Cl.
| | |
|---|---|
| *H04N 5/225* | (2006.01) |
| *G03B 13/10* | (2021.01) |
| *G03B 17/04* | (2021.01) |
| *G03B 17/56* | (2021.01) |

(52) U.S. Cl.
CPC ....... *H04N 5/225251* (2018.08); *G03B 13/10* (2013.01); *G03B 17/04* (2013.01); *G03B 17/563* (2013.01)

(58) Field of Classification Search
CPC ................ G06F 1/1616; G06F 1/1681; H04N 5/225251; E05D 7/085; E05D 15/52
See application file for complete search history.

(56) References Cited

U.S. PATENT DOCUMENTS

2007/0242150 A1* 10/2007 Terada ............. H04N 5/225251
348/333.06

FOREIGN PATENT DOCUMENTS

| JP | 2018-054913 A | | 4/2018 | | |
|---|---|---|---|---|---|
| JP | 2018054913 A | * | 4/2018 | ............... | G09F 9/00 |

* cited by examiner

*Primary Examiner* — Noam Reisner
(74) *Attorney, Agent, or Firm* — Cowan, Liebowitz & Latman, P.C.

(57) ABSTRACT

A display apparatus includes a display unit, a display unit cover configured to hold the display unit, a first plate configured to move integrally with the display unit cover, a second plate, a first shaft provided on the second plate and rotatably supporting the first plate, a third plate, a second shaft provided on the third plate, parallel to the first shaft, and rotatably supporting the second plate, a third shaft orthogonal to the second shaft and rotatably supporting the third plate, and a first guide member provided on the third plate and configured to restrict operation areas of the first plate and the second plate. Where the first shaft is closest to the third plate within the operation area of the second plate around the second shaft, the first guide member is closer to the display unit cover than the third plate.

7 Claims, 8 Drawing Sheets

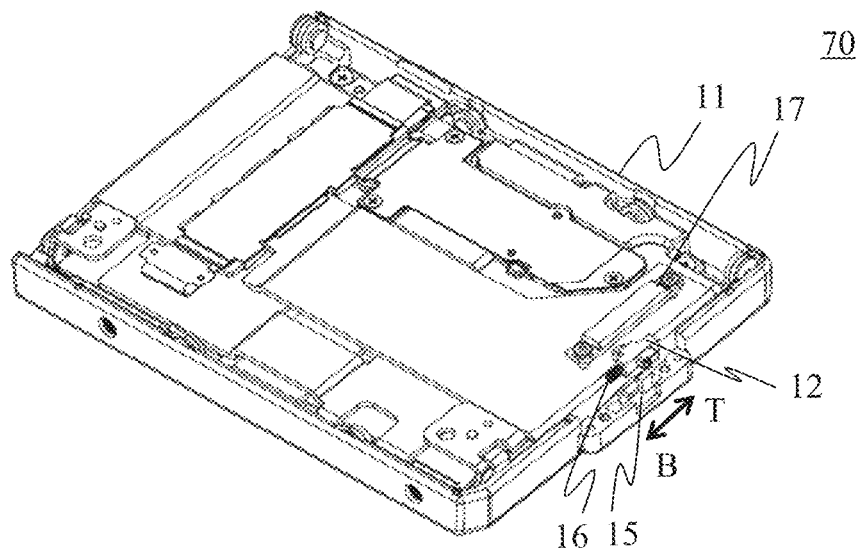
FIG. 6A
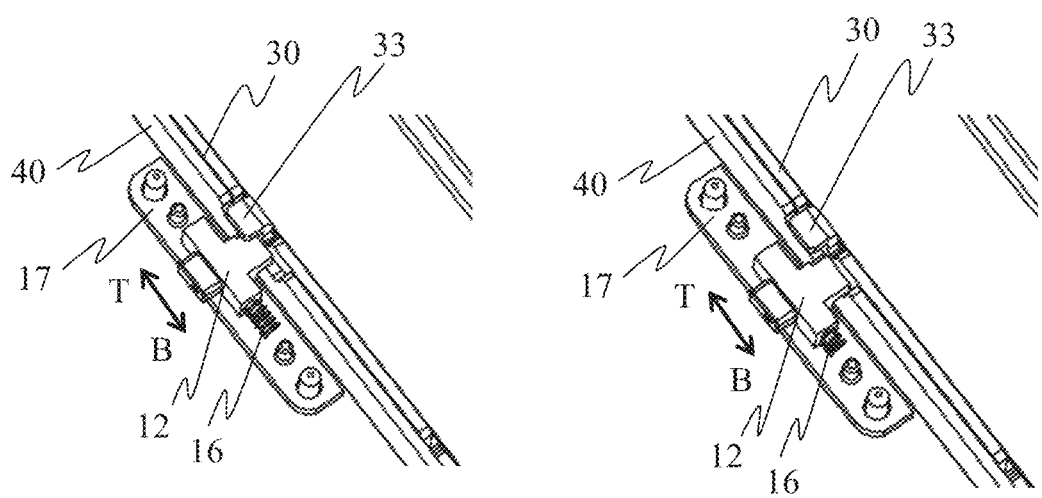
FIG. 6B
FIG. 6C

DISPLAY APPARATUS AND ELECTRONIC APPARATUS

BACKGROUND OF THE INVENTION

Field of the Invention

The present invention relates to a display apparatus and an electronic apparatus including a mechanism having a plurality of rotation axes rotatable in different directions.

Description of the Related Art

One conventionally known mechanism changes a display direction of a display apparatus relative to a housing holding the display apparatus so that a user can easily confirm an image or the like displayed on the display apparatus.

Japanese Patent Laid-Open No. ("JP") 2018-54913 discloses an electronic apparatus that includes a display unit rotatable relative to a housing by using a hinge mechanism having a plurality of rotation axes rotatable in different directions.

However, the electronic apparatus disclosed in JP 2018-54913 needs a large clearance between the display unit and components that do not rotate together or rotate the display unit in different directions so as to prevent the rotated display unit from interfering with these components. Thus, the electronic apparatus becomes large.

SUMMARY OF THE INVENTION

The present invention provides a display apparatus and an electronic apparatus, each of which can prevent an increasing size of a mechanism that enables a display unit to rotate in a plurality of directions relative to a housing that holds the display unit.

A display apparatus according to one aspect of the present invention includes a display unit, a display unit cover configured to hold the display unit, a first plate configured to move integrally with the display unit cover, a second plate, a first shaft provided on the second plate and configured to rotatably support the first plate, a third plate, a second shaft provided on the third plate, parallel to the first shaft, and configured to rotatably support the second plate, a third shaft orthogonal to the second shaft and configured to rotatably support the third plate, and a first guide member provided on the third plate and configured to restrict operation areas of the first plate and the second plate. Where the first shaft is located closest to the third plate within the operation area of the second plate around the second shaft, the first guide member is closer to the display unit cover than the third plate.

Further features of the present invention will become apparent from the following description of exemplary embodiments with reference to the attached drawings.

BRIEF DESCRIPTION OF THE DRAWINGS

FIGS. 6A to 6C are a perspective view and its enlarged views of a lock mechanism for restricting the display unit of the digital camera according to this embodiment from tilting (or rotating) in the right and left directions relative to the housing.

DESCRIPTION OF THE EMBODIMENTS

Referring now to the accompanying drawings, a detailed description will be given of embodiments according to the present invention.

Figure 1A:
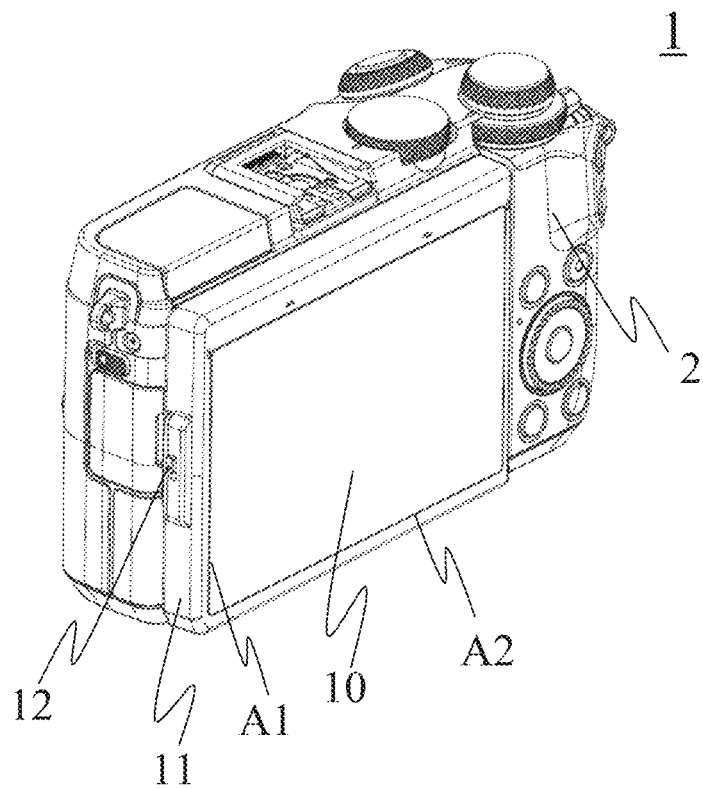
FIGS. 1A and 1B are a rear perspective view and a top view illustrating that a display unit in a digital camera according to one embodiment is folded in a housing.
Figure 1B:
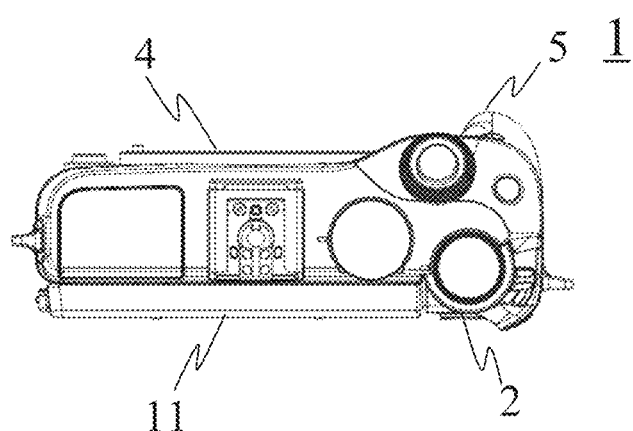
Figure 2A:
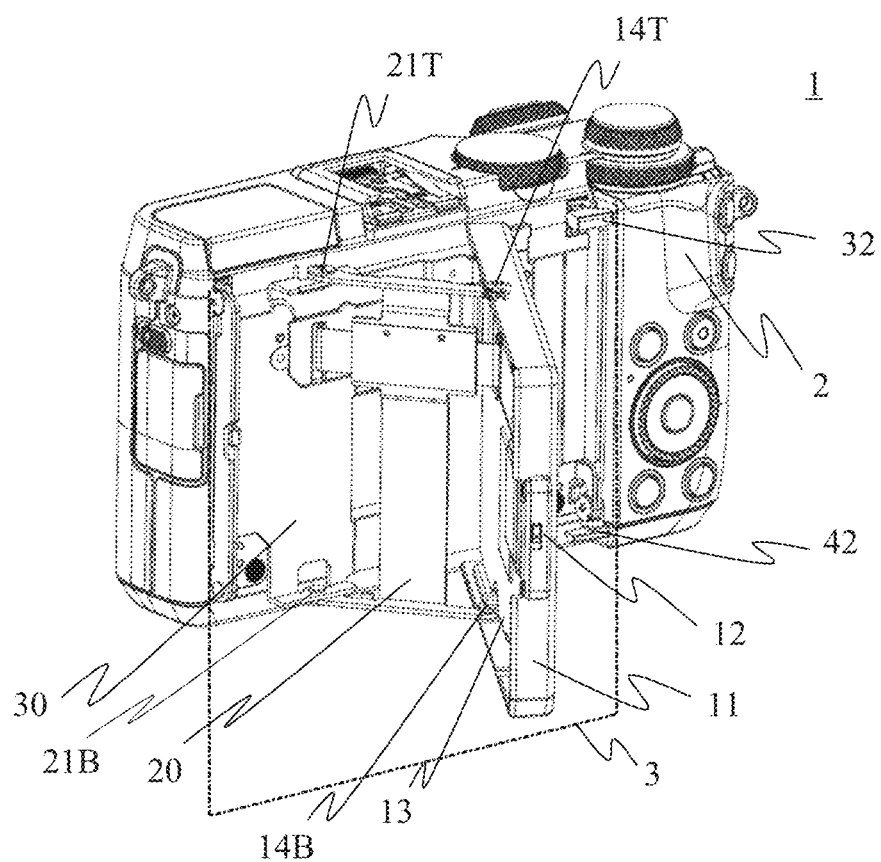
FIGS. 2A and 2B are rear perspective views illustrating that the display unit in the digital camera according to this embodiment is tilted in right and left directions relative to the housing.
Figure 2B:
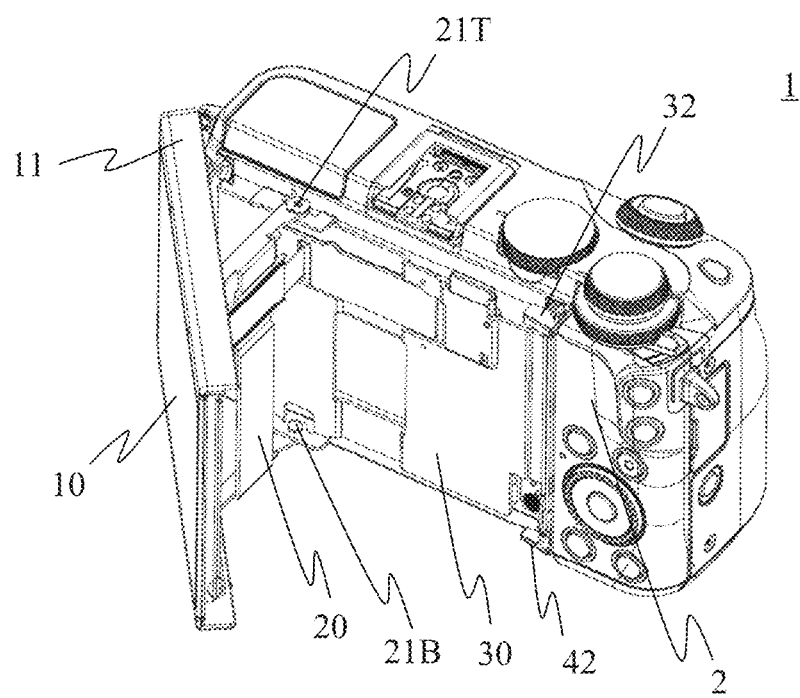
Figure 3A:
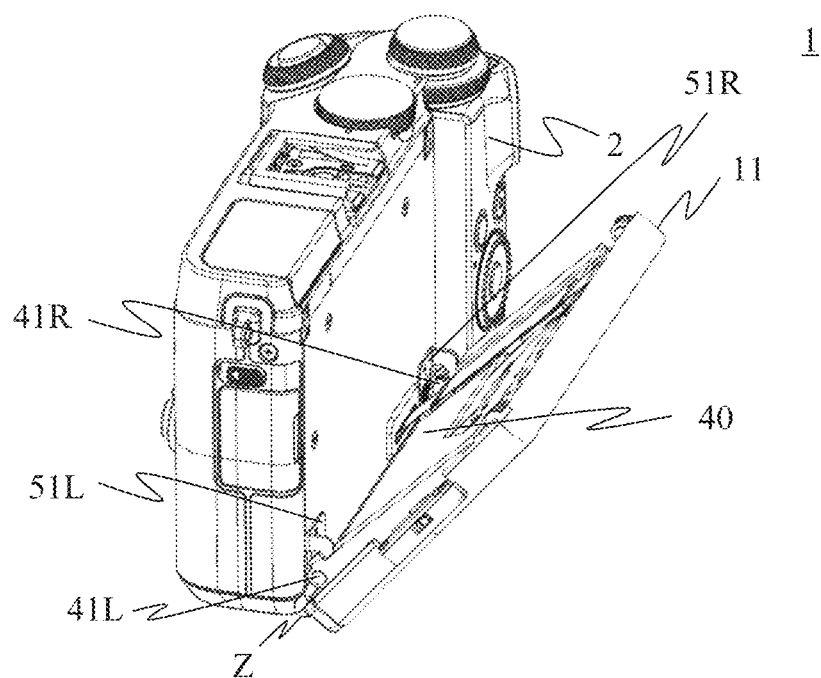
FIGS. 3A and 3B are rear perspective views illustrating that the display unit in the digital camera according to this embodiment is tilted in upper and lower directions relative to the housing.
Figure 3B:
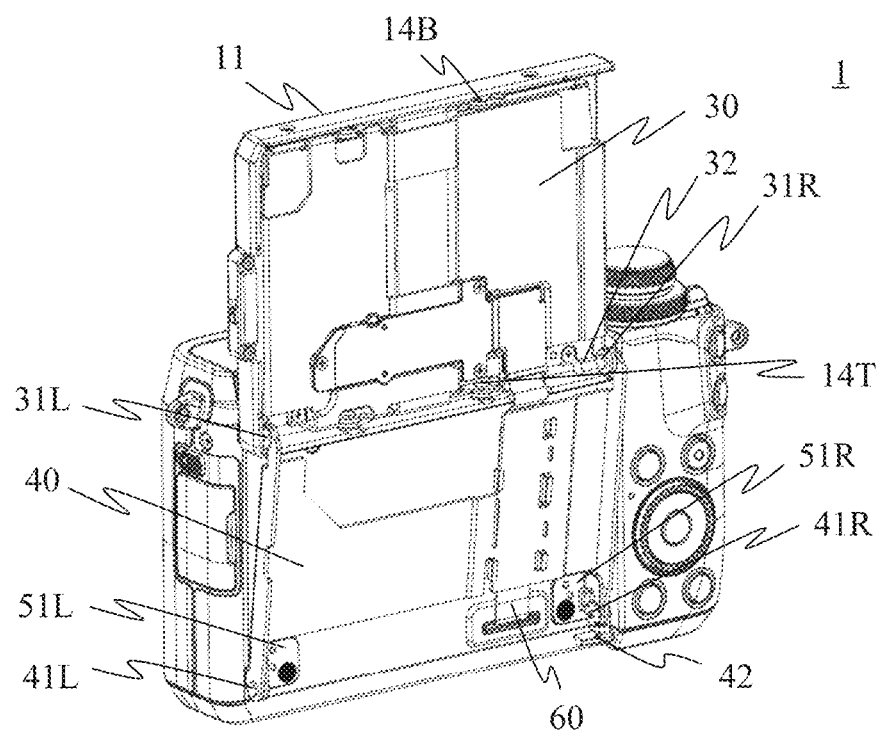

Referring now to FIGS. 1A to 3B, a description will be given of a configuration of a digital camera ("camera") 1 which is an image pickup apparatus according to this embodiment. FIG. 1A is a rear perspective view illustrating that a display unit 10 in the camera 1 is not rotated (or tilted) relative to a housing. FIG. 1B is a top view illustrating the same state. This embodiment will refer to the state of the display unit 10 illustrated in FIGS. 1A and 1B as a folded (or stowed) state. FIG. 2A is a rear perspective view illustrating that the display unit 10 in the camera 1 is tilted (or unfolded) (or rightward tilted) in the right direction relative to the housing. FIG. 2B is a rear perspective view illustrating that the display unit 10 in the camera 1 is tilted in the left direction (or leftward tilted) relative to the housing. FIG. 3A is a rear perspective view illustrating that the display unit 10 in the camera 1 is tilted in the lower direction (downward tilted) relative to the housing. FIG. 3B is a rear perspective view illustrating that the display unit 10 in the camera 1 is tilted in the upper direction (upward tilted) relative to the housing.

As illustrated in FIGS. 1A to 3B, the rear surface of the camera 1 includes a rear grip 2, a display unit 10, a display unit cover (or casing) 11, and an opening/closing mechanism 3. The front surface of the camera 1 has a mount portion 4 to which a lens unit (interchangeable lens) is detachably attachable, and a front grip 5. The display unit 10 is disposed on the rear side of the mount portion 4 on the optical axis of the lens unit to facilitate image pickup. None of the front grip 5 and the rear grip 2 overlap the mount portion 4 or the display 10 when viewed from the rear surface side in a projection manner so that the housing of the camera 1 can be easily held and display information on the display 10 can be easily viewed.

In the camera 1 according to this embodiment, the display unit 10 can be tilted in four different directions relative to the housing by the opening/closing mechanism 3. This embodiment makes the display unit 10 from a TFT type LCD (thin film transistor driving type liquid crystal display), but the present invention is not limited to this embodiment. For example, another method such as organic electronic luminescence may be adopted. The display unit cover 11 is made of polycarbonate (PC) resin, and the display unit 10 is fixedly held by a double-sided tape. In this embodiment, the display unit 10, the display unit cover 11, and the opening/closing mechanism 3 are collectively referred to as a display apparatus. Further, in the following description, as illustrated in FIGS. 1A and 1B, A1 is a short side of the display unit 10 and A2 is a long side of the display unit 10.

Next follows a description of the opening/closing mechanism 3. The opening/closing mechanism 3 has, as four rotation axes, first shafts 14T and 14B, second shafts 21T and 21B, third shafts 31L and 31R, and fourth shafts 41L and 41R. Although each axis is divided into two places, they are on the same axis and are treated as one axis. The opening/closing mechanism 3 includes a first plate 13, a second plate 20, a third plate 30, and a fourth plate 40. These four plates are sheet metal components, and made of stainless steel in this embodiment.

The first plate 13 in the opening/closing mechanism 3 is fixed onto the display unit cover 11 and moves integrally with the display unit cover 11. The first plate 13 is rotatably supported on the second plate 20 by the first shafts 14T and 14B that are approximately parallel to short side A1 of the display unit 10. Herein, the term "approximately parallel" is not limited to "being strictly parallel," but includes "being evaluated as being substantially parallel." This is similarly applied to the following description. In this embodiment, the first shafts 14T and 14B are disposed at the approximately center of the display unit cover 11 in a direction along the third shafts 31L and 31R. In other words, the first shafts 14T and 14B are provided at the approximately center of the first plate 13 in a direction along long side A2 of the display unit 10 and at both ends in the direction along the short side A1 of the display unit 10.

The second plate 20 is rotatably supported on the third plate 30 around the second shafts 21T and 21B approximately parallel to the first shafts 14T and 14B. The second shafts 21T and 21B are more distant from the rear grip 2 than the first shafts 14T and 14B in the direction along the long side A2 of the display unit 10 of the second plate 20 when the display unit 10 is folded, and provided at both ends in the direction along the short side A1 of the display unit 10.

The third plate 30 is rotatably supported on the fourth plate 40 around third shafts 31L and 31R approximately parallel to the long side A2 of the display unit 10. The third shafts 31L and 31R are provided at both ends in the direction along the long side A2 of the display portion 10 of the third plate 30 when the display unit 10 is folded, and at upper ends in the direction along the short side A1 of the display portion 10.

The fourth plate 40 is rotatably supported on base plates 51L and 51R fixed onto the housing of the camera 1 by fourth shafts 41L and 41R approximately parallel to the third shafts 31L and 31R. The fourth shafts 41L and 41R are provided at both ends of the fourth plate 40 in the direction along the long side A2 of the display unit 10 when the display unit 10 is folded, and at lower ends of the fourth plate 40 in the direction along the short side A1 of the display unit.

The first shafts 14T and 14B and the second shafts 21T and 21B are the rotation axes that are approximately parallel to each other, and are approximately orthogonal to each of the third shafts 31L and 31R and the fourth shafts 41L and 41R, which are substantially parallel to each other. In other words, the first shafts 14T and 14B are approximately orthogonal to each of the third shafts 31L and 31R and the fourth shafts 41L and 41R, and the second shafts 21T and 21B are approximately orthogonal to each of the third shafts 31L and 31R and the fourth shafts 41L and 41R.

Figure 4A:
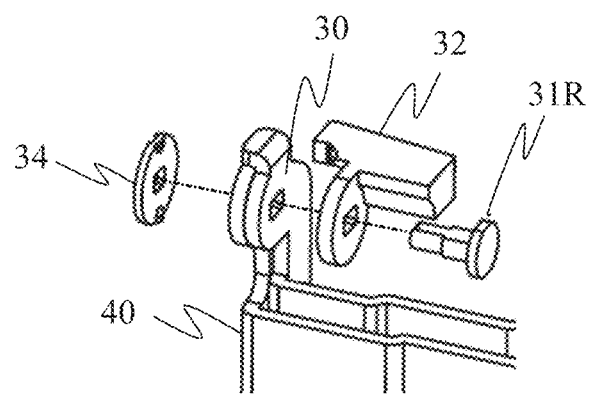
FIGS. 4A and 4B are exploded and enlarged perspective views of a rotation shaft portion including a first guide member and a second guide member according to the embodiment.
Figure 4B:
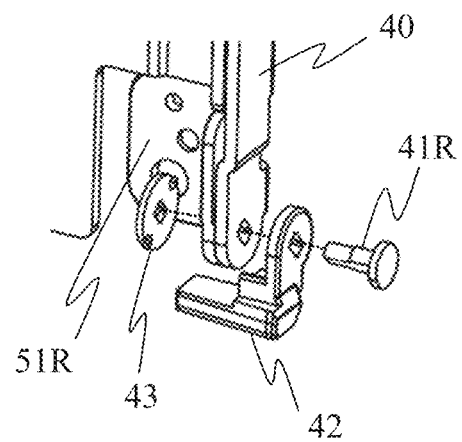

Referring now to FIGS. 4A and 4B, a description will be given of a configuration of each rotation shaft portion including each rotation shaft in the opening/closing mechanism 3. FIG. 4A is an exploded enlarged view of the rotation shaft portion including the third shaft 31R. FIG. 4B is an exploded enlarged view of the rotation shaft portion including the fourth shaft 41R. As illustrated in FIG. 4A, the third shaft 31R is inserted into holes formed in the first guide member 32, the third plate 30, and the fourth plate 40. Thereafter, the third shaft 31R and the torque plate 34 are caulked so as to sandwich the first guide member 32, the third plate 30, and the fourth plate 40, so that the third plate 30 and the four plates 40 are rotatably connected. The third shaft 31R and the holes formed in the first guide member 32 and the third plate 30 have a two-way shape and rotate integrally. At this time, the torque plate 34 biases the fourth plate 40 to generate a sliding torque in rotating the third plate 30 relative to the fourth plate 40.

As illustrated in FIG. 4B, the fourth shaft 41R is inserted into holes formed in the second guide member 42, the fourth plate 40, and the base plate 51R. Thereafter, the fourth shaft 41R and the torque plate 43 are caulked so as to sandwich the second guide member 42, the fourth plate 40, and the base plate 51R, so that the fourth plate 40 and the base plate 51R are rotatably connected. The fourth shaft 41R and the holes formed in the second guide member 42 and the fourth plate 40 have a two-way shape, and rotate integrally. At this time, the torque plate 43 biases the base plate SR to generate a sliding torque in rotating the third plate 30 relative the base plate 51R.

Each of the first guide member 32 and the second guide member 42 is made of a polyacetal (POM) resin having good slidability, and details of the functions thereof will be described later. In the other rotation shaft portion in the opening/closing mechanism 3, the shaft is inserted only into the holes formed in the two plates, and the two plates are rotatably connected by caulking with the torque plate disposed on the opposite side.

Next follows a description of the respective behaviors of the tilt operation of the display unit 10 in the four directions. When the display unit 10 is tilted around the fourth shafts 41L and 41R, the display unit 10 enters the downward tilt state as illustrated in FIG. 3A. At this time, when the display unit 10 is tilted by about 0.5° around the fourth shafts 41L and 41R from the folded state, the lower end of the display unit cover 11 and the housing of the camera 1 are brought into contact with each other at the position Z in FIG. 3A. When the display unit 10 is further tilted about the fourth shafts 41L and 41R, a force for rotating the display unit 10 around the third shafts 31L and 31R is generated due to the reaction from the housing of the camera 1. When the two rotations interlock, the display unit 10 can be tilted down to the state illustrated in FIG. 3A. Where the display unit 10 is in the downward tilt state the camera 1 is in a state suitable, for example, to confirm the display information of the display unit 10 when the user holds the camera 1 at a landscape orientation (normal position) and captures an object from a high angle.

When the display unit 10 is tilted around the third shafts 31L and 31R the display unit 10 is in the upward tilt state as illustrated in FIG. 3B. At this time, when the display unit 10 is tilted by about 9° around the third shafts 31L and 31R, the upper end of the display unit cover 11 and the housing of the camera 1 are brought into contact with each other. When the display unit 10 is further tilted around the third shafts 31L and 31R, a force for rotating the display unit 10 around the fourth shafts 41L and 41R is generated due to the reaction from the housing of the camera 1. When the two rotations interlock, the display unit 10 can be tilted up to the state illustrated in FIG. 3B. When the display unit 10 is in the upward tilt state, the display unit 10 faces the object side and the camera 1 is in a state suitable to confirm the display unit 10 from the object side in selfie etc. By stopping the tilt operation around the third shafts 31L and 31R at about 90°, the camera is in the state suitable to confirm the display information of the display unit 10 when the user holds the camera 1 at the landscape orientation (normal position) and captures an object from a low angle.

Figure 5A:
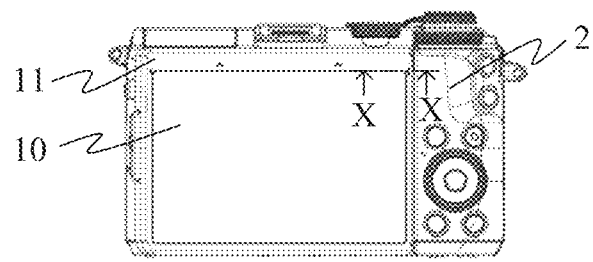
FIGS. 5A to 5C are a rear view and sectional views near the first guide member when the display unit in the digital camera according to this embodiment is tilted (or rotated) in the right direction relative to the housing.
Figure 5B:
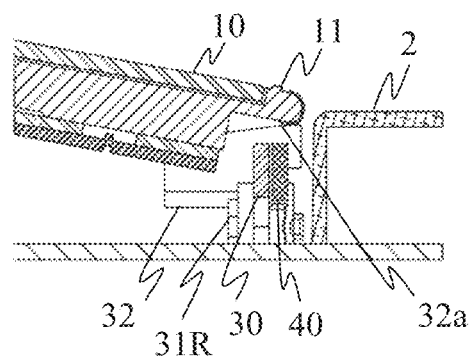
Figure 5C:
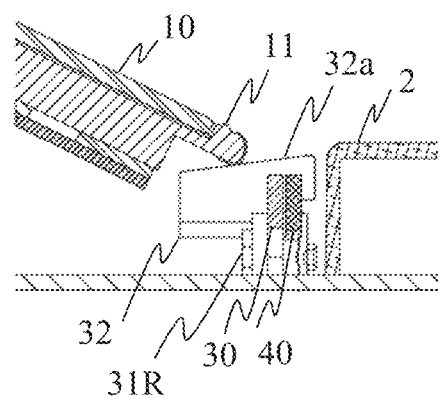

Referring now to FIGS. 5A to 5C, a description will be given of the behavior when the display unit 10 is tilted around the first shafts 14T and 14B. FIG. 5A illustrates that the display unit 10 is tilted by about 10° around the first shafts 14T and 14B. FIG. 5B is a sectional view taken along line X-X in FIG. 5A. FIG. 5C is a sectional view taken along line X-X in FIG. 5A when the display unit 10 is tilted by about 25° around the first shafts 14T and 14B. As illustrated in FIG. 5B, when the display unit 10 is tilted around the first shafts 14T and 14B, the end of the display unit cover 11 on the rear grip 2 side contacts a slope 32a of the first guide member 32. When the display unit 10 is further tilted, as illustrated in FIG. 5C, the display unit cover 11 continues to tilt along the slope 32a. At this time, since the first guide member 32 is made of a material having good slidability, the display unit 10 can perform a smooth tilt operation.

In the folded state of the display apparatus, the slope 32a is closer to the display unit cover 11 than each of the third plate 30 and the fourth plate 40. This structure can prevent the display unit cover 11 from contacting each of the third plate 30 and the fourth plate 40. Since each of the third plate 30 and the fourth plate 40 is a sheet metal component and has a rough end surface shape, when the display unit cover 11 contacting each of them would be hitched and unable to perform the smooth tilt operation. An attempt to avoid this contact without providing the first guide member 32 would need a clearance between the rotation locus of the display unit cover 11 and each of the third plate 30 and the fourth plate 40, causing an increased size of the display apparatus.

The second guide member 42 also has the same slope as that of the first guide member 32, and has the same action as the first guide member 32 with respect to the tilt operation of the display unit 10. When the third plate 30 is made of a material having good slidability, the third plate 30 and the first guide member 32 may be made of a single component. Similarly, when the fourth plate 40 is made of a material having good slidability, the fourth plate 40 and the second guide member 42 may be made of a single component.

Thus, the first guide member 32 is provided on the third plate 30, and restricts the operation area of each of the first plate 13 and the second plate 20. Where the first shafts 14T and 14B are located closest to the third plate 30 within the operation area of the second plate 30 around the second shafts 21T and 21B, the first guide member 32 is closer to the display unit cover 11 than the third plate 30. The second guide member 42 is provided on the fourth plate 40, and restricts the operation area of each of the first plate 13 and the second plate 20. Where the first shafts 14T and 14B are located closest to the third plate 30 within the operation area of the second plate 20 around the second shafts 21T and 21B, the second guide member 42 is closer to the display unit cover 11 than each of the third plate 30 and the fourth plate 40. The first guide member 32 and the second guide member 42 are disposed at the positions (symmetrical positions) opposite to the positions of the second shafts 21T and 21B with respect to the positions of the first shafts 14T and 14B in the direction along the third shafts 31L and 31R. The first guide member 32 and the second guide member 42 have slopes (slope portions 32a and the like) that separate from the display cover 11 toward the first shafts 14T and 14B in the direction along the third shafts 31L and 31R.

After the display unit 10 further tilts and passes the first guide member 32, the display unit cover 11 contacts the housing of the camera 1 and the tilt operation continues. During the above tilt operation, a force for rotating the display unit 10 around the fourth shafts 41L and 41R is generated due to the reactions from the first guide member 32, the second guide member 42, and the housing of the camera 1. When the two rotations interlock, the display unit 10 can be tilted in the right direction up to the state illustrated in FIG. 2A. For example, when the user holds the camera 1 at the portrait orientation and captures an object from a low angle, the camera 1 where the display unit cover 11 is in the right tilt state is suitable to confirm the display information on the display unit 10. In the right tilt state of the display unit 10, the display unit 10 is separated from the rear grip 2, so that the display unit 10 is prevented from being covered by the user's hand holding the rear grip 2 and the visual recognition of the display unit 10 from lowering.

When the display unit 10 is further tilted from the right tilt state of the display unit 10 around the second shafts 21T and 21B, the left tilt state illustrated in FIG. 2B is obtained. The camera 1 when the display unit 10 is in the left tilt state is suitable, for example, to confirm the display information of the display unit 10 when the user holds the camera 1 at the portrait orientation and captures an object from a high angle.

Referring now to FIGS. 6A to 6C, a description will be given of a lock mechanism 70 relating to the tilt operation of the display unit 10. In the camera 1 according to this embodiment, the tilt operation of the display unit 10 uses the four axes of the first shafts 14T and 14B, the second shafts 21T and 21B, the third shafts 31L and 31R, and the fourth shafts 41L and 41R as rotation shafts. Now assume that the independent tilt operation around each rotation axis is always available, when the user tilts the display unit 10, an undesired tilt operation may be unexpectedly performed. Accordingly, the display apparatus according to this embodiment includes the lock mechanism 70 that prevents the display unit 10 from unexpectedly tilting around the first shafts 14T and 14B and the second shafts 21T and 21B. Hereinafter, the details will be described.

FIG. 6A is a perspective view of the lock mechanism 70 of the display apparatus disassembled from the camera 1 viewed from the housing side of the camera 1. FIGS. 6B and 6C are perspective views of the display apparatus on the display apparatus 10 side in which the lock mechanism 70 is enlarged, and the display unit 10 and the display unit cover 11 are not shown for description convenience. The lock mechanism 70 includes a lever housing 15, a releasing lever 12, a compression coil spring 16, a lid member 17 fixed to the display unit cover 11, and a lever hook 33 formed on the third plate 30.

The releasing lever 12 is sandwiched between the lever housing 15 and the lid member 17 movably in the directions indicated by the arrows (T and B directions) illustrated in FIG. 6A, and biased in the arrow T direction by the compression coil spring 16. FIG. 6B illustrates that the releasing lever 12 is not operated when the display apparatus is folded. At this time, since the releasing lever 12 is engaged with the lever hook 33, the display cover 11 holding the releasing lever 12 cannot be tilted around the first shafts 14T and 14B and the second shaft 21T and 21B relative to the third plate 30. Therefore, when the releasing lever 12 is not operated, the right tilt operation and the left tilt operation of the display unit 10 can be restricted. By moving the releasing lever 12 with a force exceeding the biasing force of the compression coil spring 16, the releasing lever 12 is disengaged from the lever hook 33, as illustrated in FIG. 6C. Hence, the display unit cover 11 can be tilted around the first shafts 14T and 14B and the second shafts 21T and 21B.

Thus, where the first shafts 14T and 14B are located closest to the third plate 30 in the operation area of the second plate 20 around the second shafts 21T and 21B, the releasing lever 12 switches the first plate 13 and the second plate 20 between a rotatable state and a nonrotatable state. In other words, the releasing lever 12 changes the rotation state of each of the first plate 13 about the first shafts 14T and 14B and the rotation of the second plate 20 about the second shafts 21T and 21B between the rotatable state and the nonrotatable state. When the display apparatus is tilted upward or downward from the folded state by the lock mechanism 70, the unexpected tilt operation around the first shafts 14T and 14B and the second shafts 21T and 21B or leftward and rightward operation can be suppressed.

On the other hand, this embodiment has no lock mechanism for suppressing the unexpected upward or downward tilt operation, in tilting the display unit 10 in the right or left direction from the folded state. Instead, this embodiment makes the rotation torques for the upward and downward tilt operations larger than the rotation torques for the rightward and leftward tilt operations, suppressing the unexpected upward or downward tilt operation.

Figure 7A:
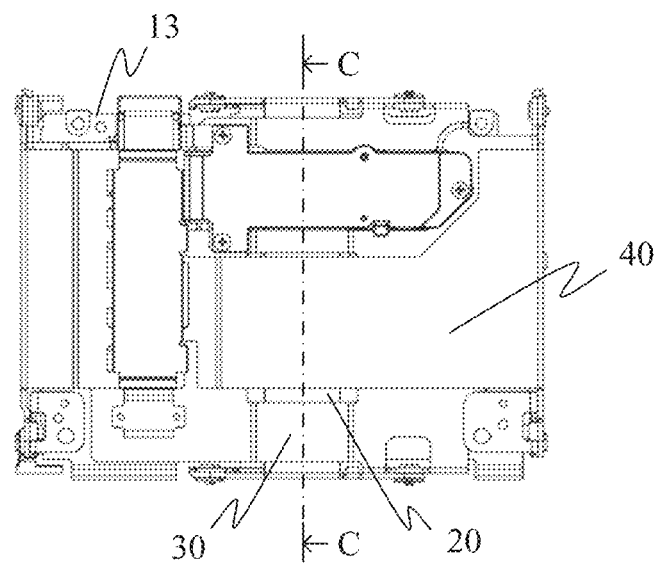
FIGS. 7A and 7B are a rear view and a sectional view of a mechanism for tilting the display unit of the digital camera according to this embodiment.
Figure 7B:
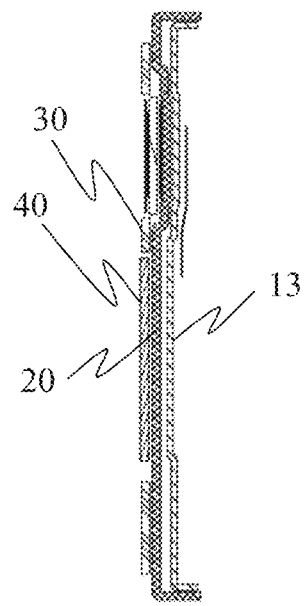

Referring now to FIGS. 7A and 7B, a description will be given of the low-profile of the opening/closing mechanism 3 according to this embodiment. FIG. 7A is the folded state diagram of the opening/closing mechanism 3. FIG. 7B is a sectional view taken along line C-C in FIG. 7A. If the first plate 13, the second plate 20, the third plate 30, and the fourth plate 40 are simply overlap each other when the opening/closing mechanism 3 is folded, the overall thickness of the opening/closing mechanism 3 increases. Thus, in this embodiment, as illustrated in FIG. 7B, the third plate 30 and the fourth plate 40 do not overlap each other in a range in which they overlap the second plate 20 having a relatively small width. Due to this configuration, at most three of the first plate 13, the second plate 20, the third plate 30, and the fourth plate 40 overlap each other, and the opening/closing mechanism 3 can be thinned by a single sheet metal component.

Figure 8A:
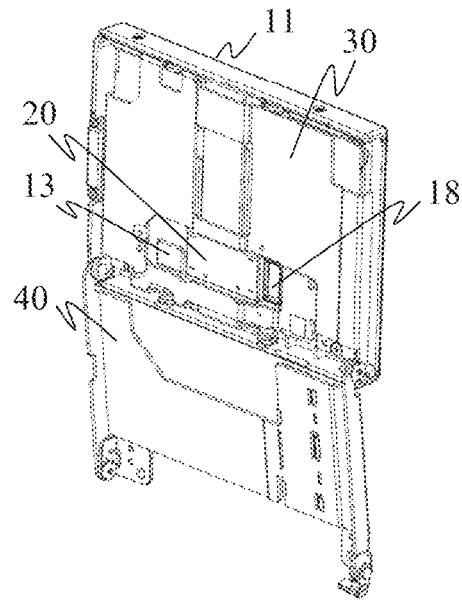
FIGS. 8A to 8D are explanatory views of a flexible printed board assembling method in the display apparatus according to this embodiment.

Referring now to FIGS. 8A to 8D and 3B, a description will be given of a distribution method of the flexible printed circuit board 60 for electrically connecting the display unit 10 and a signal processing substrate (not shown) mounted on the housing of the camera 1. FIG. 8A illustrates the upward tilt operation performed by the display apparatus alone. FIG. 8A omits the flexible printed circuit board 60 for description convenience. The flexible printed circuit board 60 connected to the display unit 10 passes through a hole 18 formed in the first plate 13 and is drawn out from a space between the display unit cover 11 and the first plate 13. The hole 18 is disposed at substantially the same position as the first shafts 14T and 14B in the direction along the long side A2 of the display unit 10.

Figure 8B:
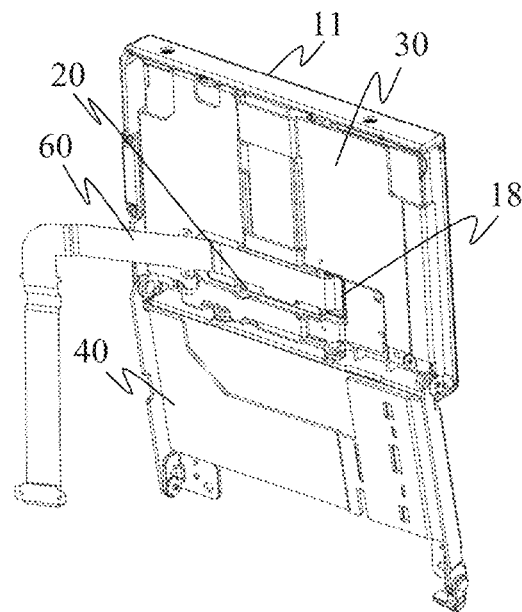

Next, as illustrated in FIG. 8B, the flexible printed circuit board 60 is provided on the second plate 20, and its part is fixed relative to the second plate 20 so as to be covered with an unillustrated single-sided tape. At this time, the workability is improved by opening the third plate 30 so as to make visible the portion of the second plate 20 where the flexible printed circuit board 60 is provided.

Figure 8C:
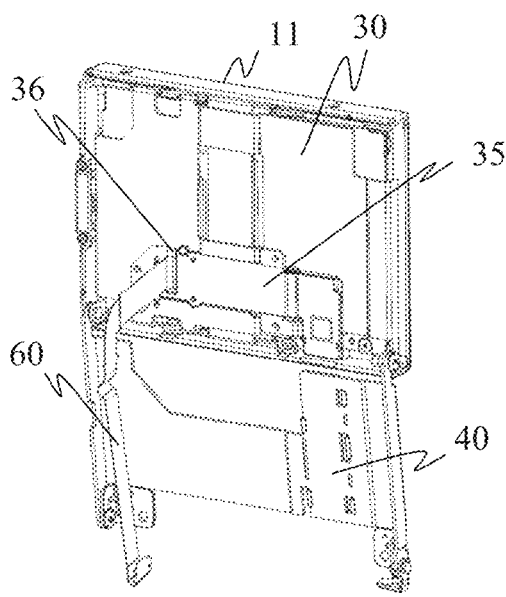

Next, as illustrated in FIG. 8C, a path member 35 is fixed onto the third plate 30 while the flexible printed circuit board 60 passes through a slit 36 in the path member 35 fixed so as to close the opening of the third plate 30. The slit 36 is disposed at substantially the same position as the second shafts 21T and 21B in the direction along the long side A2 of the display unit 10.

Figure 8D:
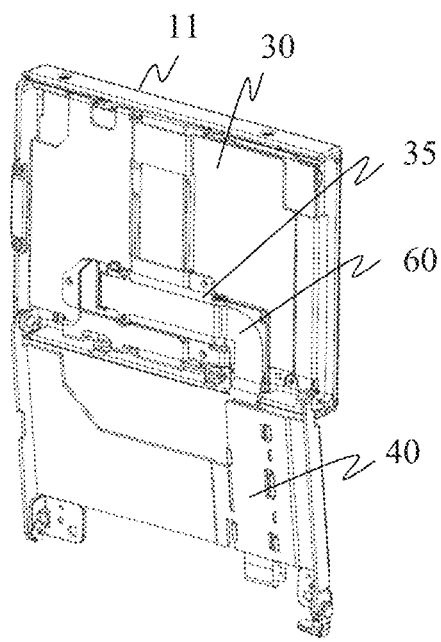

Then, as illustrated in FIG. 8D, the path is bent by 90° to the third shafts 31L and 31R toward the fourth plate 40 while the flexible printed circuit board 60 is fixed onto the path member 35 with the double-sided tape. At this time, the flexible printed circuit board 60 is fixed onto the path member 35 up to a position substantially the same as the third shafts 21T and 21B in the direction along the short side A1 of the display unit 10.

Finally, as illustrated in FIG. 3B, the flexible printed circuit board 60 is provided to the inside of the housing opening of the camera 1 from an opening formed at substantially the same position as the fourth shafts 41L and 41R in the direction along the short side A1 of the display unit 10, and is electrically connected to the signal processing substrate. As described above, the flexible printed circuit board 60 is disposed so as to be folded at substantially the same position as the position in the direction along the short side A1 or the direction along the long side A2 of the display unit 10 in each rotation shaft portion in the opening/closing mechanism 3. Hence, even when the tilting operation is performed by the opening/closing mechanism 3, the required path length of the flexible printed circuit board 60 does not change. As a result, a space or a mechanism for absorbing the change is not required, and the size of the display apparatus can be maintained.

This embodiment can provide a hinge mechanism having a plurality of rotation shafts rotatable in different directions relative to the housing that holds the hinge mechanism, which mechanism can avoid the interference between components without increasing its size and maintains the smooth rotation with no hitch. Hence, this embodiment can provide a display apparatus and an electronic apparatus, each of which can maintains the size of mechanism that enables the display unit to be rotatable in a plurality of directions relative to the holding housing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, this embodiment provides the camera 1 as the image pickup apparatus with the display apparatus having the display unit 10 and the opening/closing mechanism 3, but the display apparatus is applicable to another image pickup apparatus, such as a digital video camera and a surveillance camera, and an electronic apparatus other than the image pickup apparatus. In the display apparatus according to this embodiment, the sides of the display unit 10 that are orthogonal to each other have different lengths, but the sides that are orthogonal to each other may be approximately the same lengths (like a square).

This application claims the benefit of Japanese Patent Application No. 2019-077737, filed on Apr. 16, 2019, which is hereby incorporated by reference herein in its entirety.

What is claimed is:

1. A display apparatus comprising:
a display unit;
a display unit cover configured to hold the display unit;
a first plate configured to move integrally with the display unit cover;
a second plate;
a first shaft provided on the second plate and configured to rotatably support the first plate;
a third plate;
a second shaft provided on the third plate, parallel to the first shaft, and configured to rotatably support the second plate;
a third shaft orthogonal to the second shaft and configured to rotatably support the third plate; and
a first guide member provided on the third plate and configured to restrict operation areas of the first plate and the second plate,
wherein where the first shaft is located closest to the third plate within the operation area of the second plate around the second shaft, the first guide member is closer to the display unit cover than the third plate, and
wherein the first shaft is disposed at a center of the display unit cover in a direction along the third shaft.

2. The display apparatus according to claim 1, further comprising:
a fourth plate provided with the third shaft; and
a fourth shaft parallel to the third shaft and configured to rotatably support the fourth plate.

3. The display apparatus according to claim 2, further comprising a second guide member provided on the fourth plate and configured to restrict the operation areas of the first plate and the second plate,
wherein where the first shaft is located closest to the third plate within the operation area of the second plate around the second shaft, the second guide member is closer to the display unit cover than each of the third plate and the fourth plate.

4. A display apparatus comprising:
a display unit;
a display unit cover configured to hold the display unit;
a first plate configured to move integrally with the display unit cover;
a second plate;
a first shaft provided on the second plate and configured to rotatably support the first plate;
a third plate;
a second shaft provided on the third plate, parallel to the first shaft, and configured to rotatably support the second plate;
a third shaft orthogonal to the second shaft and configured to rotatably support the third plate;
a first guide member provided on the third plate and configured to restrict operation areas of the first plate and the second plate;
a fourth plate provided with the third shaft;
a fourth shaft parallel to the third shaft and configured to rotatably support the fourth plate; and
a second guide member provided on the fourth plate and configured to restrict the operation areas of the first plate and the second plate,
wherein where the first shaft is located closest to the third plate within the operation area of the second plate around the second shaft, the first guide member is closer to the display unit cover than the third plate,
wherein where the first shaft is located closest to the third plate within the operation area of the second plate around the second shaft, the second guide member is closer to the display unit cover than each of the third plate and the fourth plate,
wherein each of the first and second guide members is opposite to a respective second shaft in a direction along the third shaft with respect to the position of the first shaft when the display apparatus is in a folded state, and
wherein each of the first guide member and the second guide member includes a slope that separates from the display unit cover toward the first shaft in a direction along the third shaft.

5. The display apparatus according to claim 4, wherein none of the first guide member and the second guide member overlap the display unit in a direction along the first shaft.

6. The display apparatus according to claim 4, further comprising a releasing lever,
wherein where the first shaft is located closest to the third plate within the operation area of the second plate around the second shaft, the releasing lever switches each of a rotation of the first plate around the first shaft and a rotation of the second plate around the second shaft between a rotatable state and a nonrotatable state.

7. A display apparatus comprising:
a display unit;
a display unit cover configured to hold the display unit;
a first plate configured to move integrally with the display unit cover;
a second plate;
a first shaft provided on the second plate and configured to rotatably support the first plate;
a third plate;
a second shaft provided on the third plate, parallel to the first shaft, and configured to rotatably support the second plate;
a third shaft orthogonal to the second shaft and configured to rotatably support the third plate;
a first guide member provided on the third plate and configured to restrict operation areas of the first plate and the second plate;
a fourth plate provided with the third shaft; and
a fourth shaft parallel to the third shaft and configured to rotatably support the fourth plate,
wherein where the first shaft is located closest to the third plate within the operation area of the second plate around the second shaft, the first guide member is closer to the display unit cover than the third plate, and
wherein each of a rotation torque in rotating the first plate around the first shaft and a rotation torque in rotating the second plate around the second shaft is smaller than each of a third rotation torque in rotating the third plate around the third shaft and a rotation torque in rotating the fourth plate around the fourth shaft.

* * * * *